(12) United States Patent
Morton et al.

(10) Patent No.: US 9,970,350 B2
(45) Date of Patent: May 15, 2018

(54) OPPOSED PISTON ENGINE WITH PISTONS HAVING CONICAL RECESSES THEREIN

(71) Applicant: VOLVO TRUCK CORPORATION, Göteborg (SE)

(72) Inventors: Richard Kellogg Morton, Hagerstown, MD (US); Jian Li, Hagerstown, MD (US); Richard Brandt, Fayetteville, PA (US)

(73) Assignee: Volvo Truck Corporation, Göteborg (SE)

( * ) Notice: Subject to any disclaimer, the term of this patent is extended or adjusted under 35 U.S.C. 154(b) by 0 days. days.

(21) Appl. No.: 15/513,046

(22) PCT Filed: Sep. 29, 2014

(86) PCT No.: PCT/US2014/058105
§ 371 (c)(1),
(2) Date: Mar. 21, 2017

(87) PCT Pub. No.: WO2016/053254
PCT Pub. Date: Apr. 7, 2016

(65) Prior Publication Data
US 2017/0254261 A1    Sep. 7, 2017

(51) Int. Cl.
*F02B 75/28*    (2006.01)
*F02B 23/06*    (2006.01)
(Continued)

(52) U.S. Cl.
CPC ........ *F02B 75/265* (2013.01); *F02B 23/0663* (2013.01); *F02B 75/24* (2013.01);
(Continued)

(58) Field of Classification Search
CPC ...... F02B 75/265; F02B 75/287; F02B 75/24; F02B 75/26; F02B 75/28; F02B 75/16;
(Continued)

(56) References Cited

U.S. PATENT DOCUMENTS

| 1,523,453 A * | 1/1925 | Scott ................. F02B 23/00 |
| | | 123/51 B |
| 2007/0119412 A1* | 5/2007 | Leone ............... F02D 41/0025 |
| | | 123/295 |

(Continued)

FOREIGN PATENT DOCUMENTS

| DE | 202012005573 U1 | 8/2012 |
| GB | 540658 | 10/1941 |
| GB | 771477 | 4/1957 |

OTHER PUBLICATIONS

International Search Report (dated Jan. 20, 2015) for corresponding international App. PCT/US2014/058105.
(Continued)

*Primary Examiner* — Lindsay Low
*Assistant Examiner* — George Jin
(74) *Attorney, Agent, or Firm* — WRB-IP LLP (57) ABSTRACT

An opposed piston engine includes a cylinder having a cylinder wall, and a pair of opposed pistons, Each face of each piston of the pair of opposed pistons has a top plane and a recess formed therein, each recess comprising a first surface defining part of a cone, the cone defined by the first surface of at least one of the recesses having a longitudinal axis that defines an angle equal to at least one half of a cone angle of the cone with the top plane.

18 Claims, 9 Drawing Sheets

(51) Int. Cl.
*F02B 75/26* (2006.01)
*F02B 75/24* (2006.01)
*F02B 75/16* (2006.01)

(52) U.S. Cl.
CPC .......... *F02B 75/287* (2013.01); *F02B 23/066* (2013.01); *F02B 75/16* (2013.01); *F02B 75/26* (2013.01); *F02B 75/28* (2013.01)

(58) Field of Classification Search
CPC ............... F02B 75/2896; F02B 75/282; F02B 2720/226; F02B 2720/258; F02B 2275/14; F02B 23/066; F02B 23/0663; F02B 23/0624; F02B 23/069; F02B 23/0666; F02B 23/0669; F02B 7/08
See application file for complete search history.

(56) References Cited

U.S. PATENT DOCUMENTS

| | | | |
|---|---|---|---|
| 2013/0036999 A1* | 2/2013 | Levy | F02B 75/282 123/299 |
| 2013/0112175 A1* | 5/2013 | Wahl | F02F 3/16 123/51 R |
| 2015/0122227 A1* | 5/2015 | Abani | B60L 11/1801 123/51 R |

OTHER PUBLICATIONS

International Pretiminary Report on Patentability (dated Sep. 30, 2016) for corresponding International App. PCT/US2014/058105.

* cited by examiner

OPPOSED PISTON ENGINE WITH PISTONS HAVING CONICAL RECESSES THEREIN

BACKGROUND AND SUMMARY

Aspects of the present invention relate to opposed piston engines and, more particularly, to opposed piston engines with particular piston face geometries.

In a conventional single piston engine, fuel is injected more or less axially in the cylinder, from the cylinder head that closes the end of the cylinder. In a conventional engine, the combustion chamber is created by the space between the cylinder head and the top of the piston, and generally takes the form of a recess in the head surface, piston top surface or both. Combustion chamber designs that create effective mixing of the fuel and air for good combustion are well established for conventional engines.

Opposed piston engines are engines in which two pistons are contained within one cylinder, with the combustion chamber formed between the pistons, and therefore there is no cylinder head. When used for a compression ignition engine, fuel is injected from a location that is located more or less radially in the cylinder wall, at the space formed between the pistons. This is referred to as "side injection". In general, opposed piston engines have traditionally suffered from relatively poor combustion, as it is much more difficult to create a chamber that effectively mixes the air and fuel, resulting in poor soot emissions, smoke, and poorer efficiency than would otherwise be expected.

One major challenge with opposed piston diesel engines is that fuel injection must enter the cylinder from the side of the cylinder, typically roughly perpendicular to the cylinder axis. This is in contrast to conventional engines, where the injection spray is more or less aligned with the cylinder axis, and which allows a combustion chamber that is axisymmetric.

Historically, most opposed piston engines have placed injectors on opposite sides of the engine in order to cause combustion to occur relatively centered in the cylinder. However, there are several disadvantages to this design of injectors on opposite sides of the cylinder. There is a danger of having the spray plumes from both injectors impinge into each other, a condition that is known in modern diesel combustion theory to lead to high soot creation. Most designs that try to keep well centered combustion have this weakness to a larger or smaller extent.

Another disadvantage is related to the fact that high pressure fuel systems are made up of components that are likely to require service during the life of the engine. Having the fuel system on both sides of the engine means that service technicians must have access to both sides of the engine, and move from side to side of the application to perform service work, which can be difficult or at least time consuming on large engines or in commercial vehicle fixed installation applications.

Further, modern high pressure fuel systems contain many delicate components, including wiring connections, high pressure fluid connections, and electrical components inside the fuel injectors. All of these are sensitive to high heat, and may leak fuel during service or in case of a mechanical failure. When injectors are located on both sides of the engine, it is very difficult to isolate the fuel passages and electrical features from close proximity to exhaust manifolds, which are a source of high heat and possible ignition source.

It is desirable to provide an opposed piston engine that provides for fuel injection in a manner that can avoid impingement of fuel spray plumes on each other. It is also desirable to avoid the disadvantages of having injectors on opposite sides of the cylinder.

According to an aspect of the present invention, an opposed piston engine comprises a cylinder having a cylinder wall, a pair of opposed pistons, each piston of the pair of opposed pistons having a face, the pair of pistons being disposed in the cylinder and movable between first positions in the cylinder in which faces of the opposed pistons and the cylinder wall define a maximum volume and second positions in the cylinder in which the faces of the opposed pistons and the cylinder wall define a minimum volume, wherein each face of each piston of the pair of opposed pistons has a top plane and a recess formed therein, each recess comprising a first surface defining part of a cone, the cone defined by the first surface of at least one of the recesses having a longitudinal axis that defines an angle equal to at least one half of a cone angle of the cone with the top plane.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
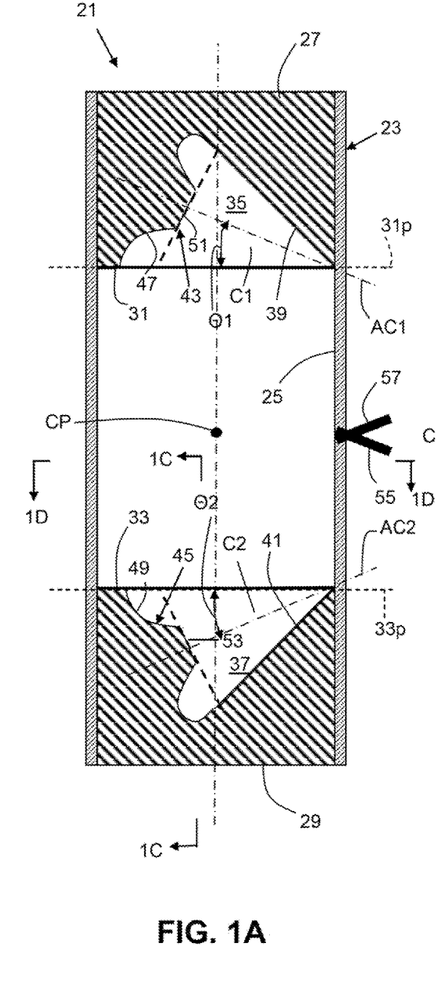
FIG. 1A is a cross-sectional, schematic view of an opposed piston engine according to an aspect of the present invention with pistons in a cylinder at a first, spaced position relative to each other.
Figure 1B:
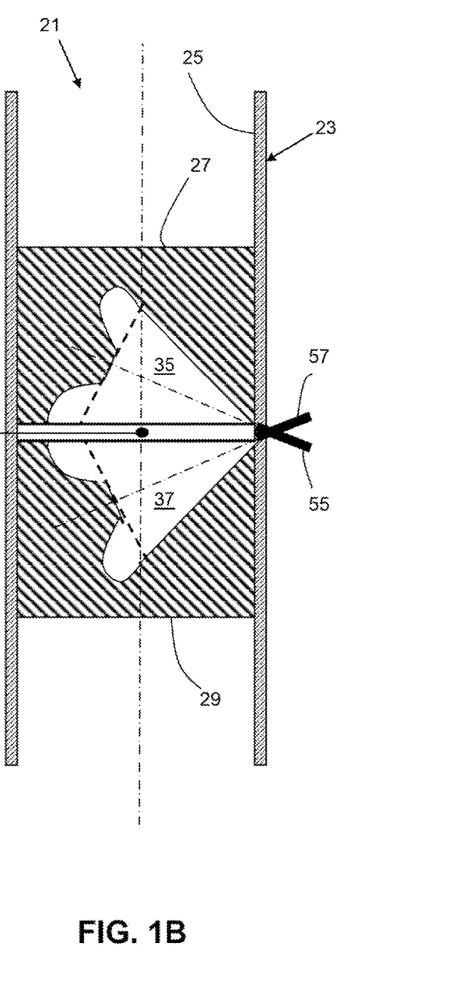
FIG. 1B is a cross-sectional, schematic view of the opposed piston engine of FIG. A with pistons in the cylinder at a second, closest position relative to each other.

An opposed piston engine 21 according to an aspect of the present invention is seen in FIGS. 1A-1B and comprises a (i.e., at least one) cylinder 23 having a cylinder wall 25 and a pair of opposed pistons 27 and 29. As seen, for example, in FIG. 1A, each piston 27 and 29 of the pair of opposed pistons has a face 31 and 33. The pair of pistons 27 and 29 is disposed in the cylinder 23 and are movable between first positions (FIG. 1A) in the cylinder in which faces 31 and 33 of the opposed pistons and the cylinder wall 25 define a maximum volume and second positions (FIG. 1B) in the cylinder in which the faces of the opposed pistons and the cylinder wall define a minimum volume. When referring to the structure of features of the pistons 27 and 29 as being "above" or "below" other features, references to features being "above" other features will typically be intended to refer to features that are closer to the center position CP between the two pistons, and features that are "below" other features will typically be further from center point. One of the pistons 27 and 29 is typically referred to as an "intake" piston as it is closer to and opens and closes an intake air opening in the cylinder wall 25, and the other piston is typically referred to as an "exhaust" piston as it is closer to and opens and closes an exhaust gas opening in the cylinder wall.

Figure 2A:
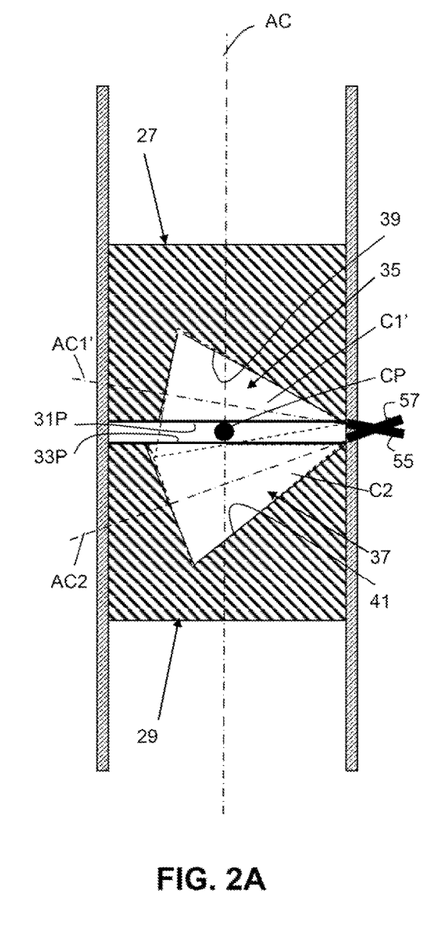
FIGS. 2A-2D are cross-sectional, schematic views of the opposed piston engine of additional aspects of the present invention with pistons in the cylinder at a second, closest position relative to each other and conical recesses at different angles relative to the planes of the faces of the pistons.
Figure 2B:
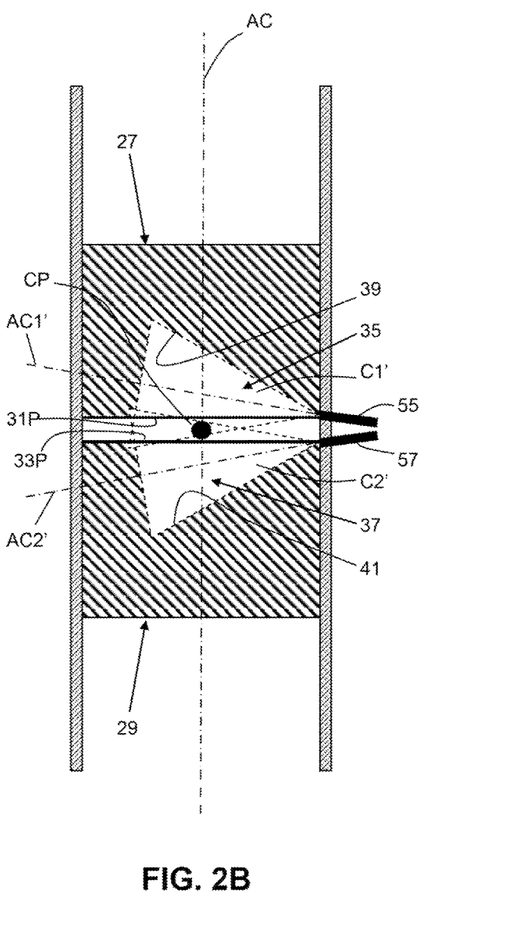
Figure 2C:
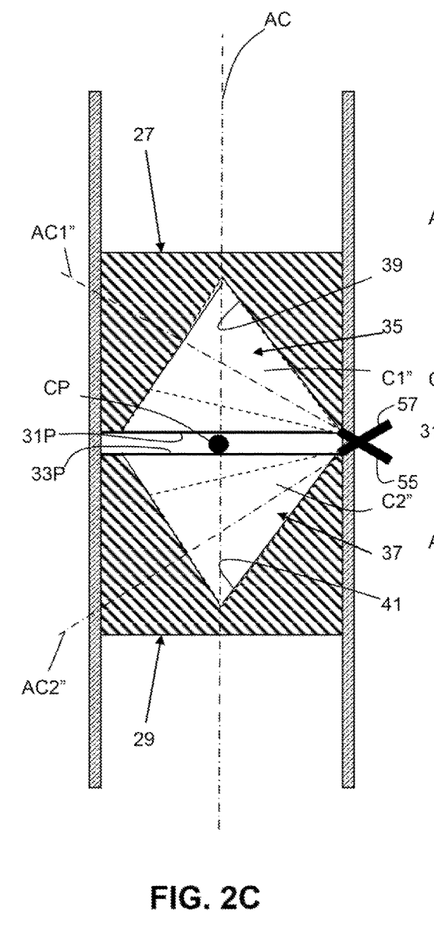
Figure 2D:
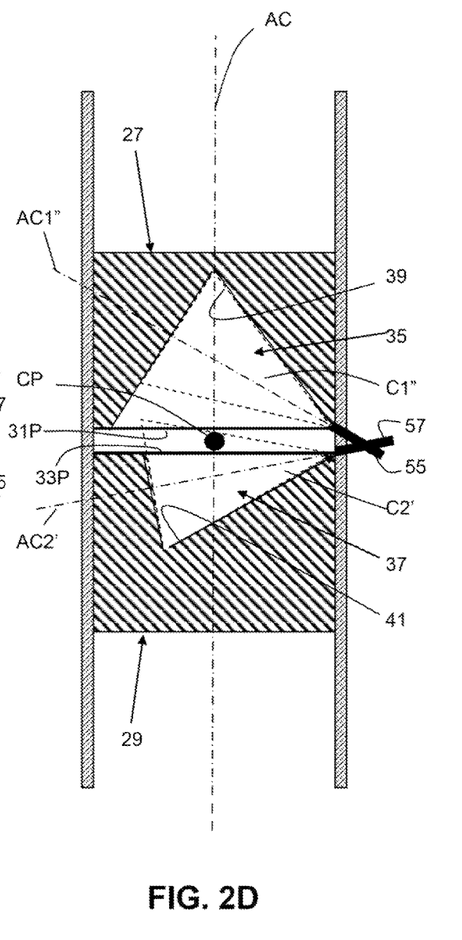

As seen, for example, in FIG. 1A, each face 31 and 33 of each piston 27 and 29 of the pair of opposed pistons has a top plane 31P and 33P and a recess (or combustion bowl) 35 and 37 formed therein. In the embodiment shown in FIGS. 1A-1B, the recesses 35 and 37 each comprise a first surface 39 and 41 (FIG. 1A) defining part of a cone, and the cone C1 and C2 defined by the first surface of at least one of the recesses 35 and 37 (in FIGS. 1A-1B, both of the recesses) has a longitudinal axis AC1 and AC2 that defines an angle Θ1 and Θ2 equal to at least one half of a cone angle and of the cone with the top plane. While each of the cones C1 and C2 can have a longitudinal axis AC1 and AC2 that defines an angle equal to at least one half of a cone angle of the cone with the top plane as in FIGS. 1A and 1B, it is also possible for one or both of the cones to have a longitudinal axis AC1' and/or AC2' that defines an angle equal to less than one half of the cone angle of the cone with the top plane as seen in FIGS. 2A, 2B, and 2D, or a longitudinal axis AC1" and/or AC2" that defines an angle equal to more than one half of the cone angle of the cone with the top plane as seen in FIGS. 2C and 2D.

Figures 1C, 1D:
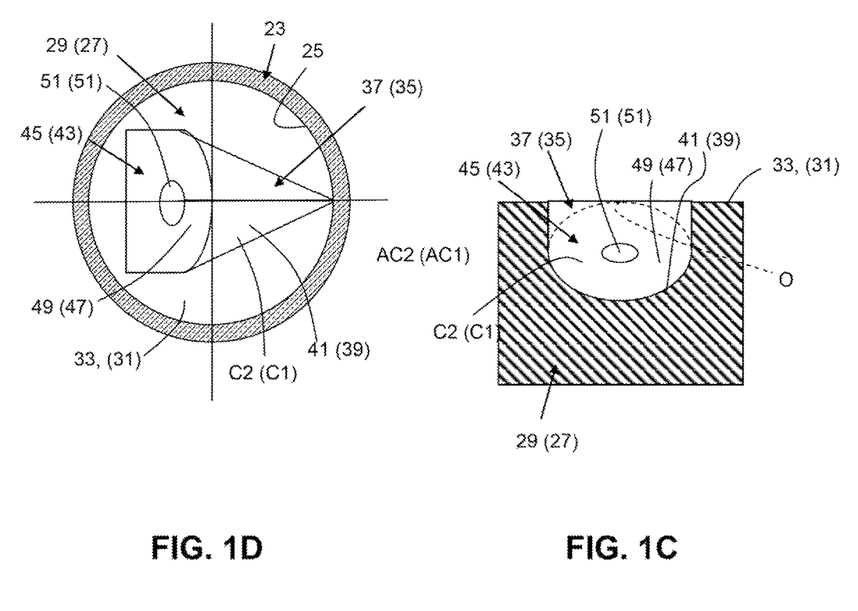
FIG. 1C is a cross-sectional, schematic view of a piston of the opposed piston engine of FIG. 1A taken at section 1C-1C of FIG. 1A.
FIG. 1D is a cross-sectional, schematic view of part of the opposed piston engine of FIG. 1A taken at section 1D-1D of FIG. 1A.

As seen in FIGS. 1C and 1D, each recess 35 and 37 ordinarily comprises a U-shaped base surface 43 and 45 at a widest end of the cone C1 and C2 (the illustration of the piston 29 applies equally to the illustration of the piston 27 whose reference numbers are shown in parentheses in FIGS. 1C and 1D). The base surface 43 and 45 can be perpendicular to the longitudinal axis AC1 and AC2 of the cones C1 and C2 as seen in FIGS. 2A-2D and as shown in phantom in FIGS. 1A and 1B. Alternatively, the base surface 43 and 45 may have some other suitable shape, such as a concave, partially toroidal portion 47 and 49 as seen in FIGS. 1A-1B and can include a "pip" or center protrusion 51 and 53 at a center of a toroid defined by the toroidal portion.

Figure 3A:
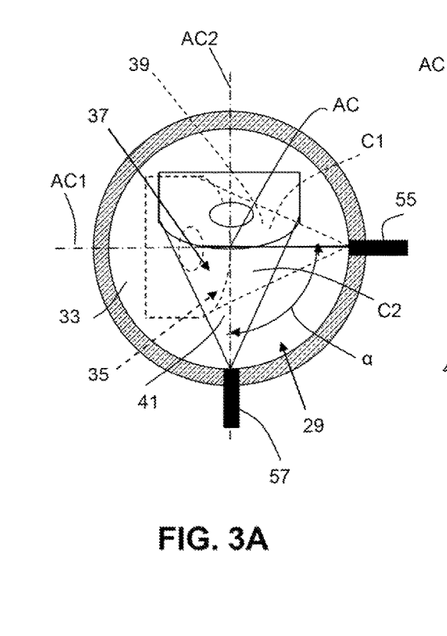
FIGS. 3A-3B are top and side cross-sectional, schematic views of the opposed piston engine of an additional aspect of the present invention with pistons in the cylinder at a second, closest position relative to each other.
Figure 3B:
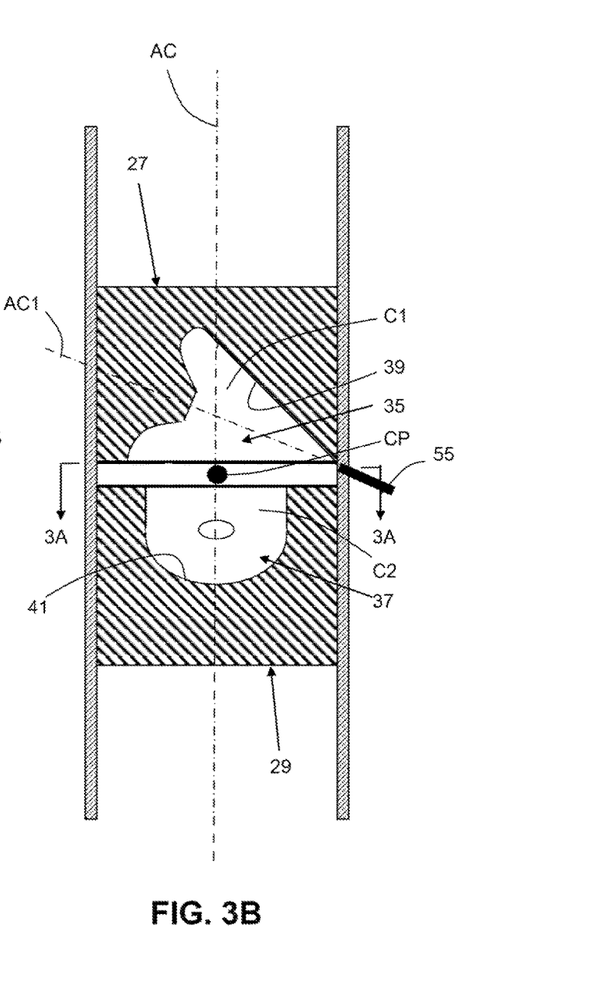
Figure 4A:
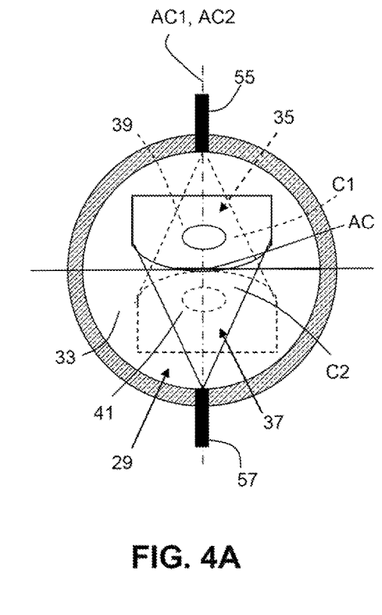
FIGS. 4A-4B are top and side cross-sectional, schematic views of the opposed piston engine of an additional aspect of the present invention with pistons in the cylinder at a second, closest position relative to each other.
Figure 4B:
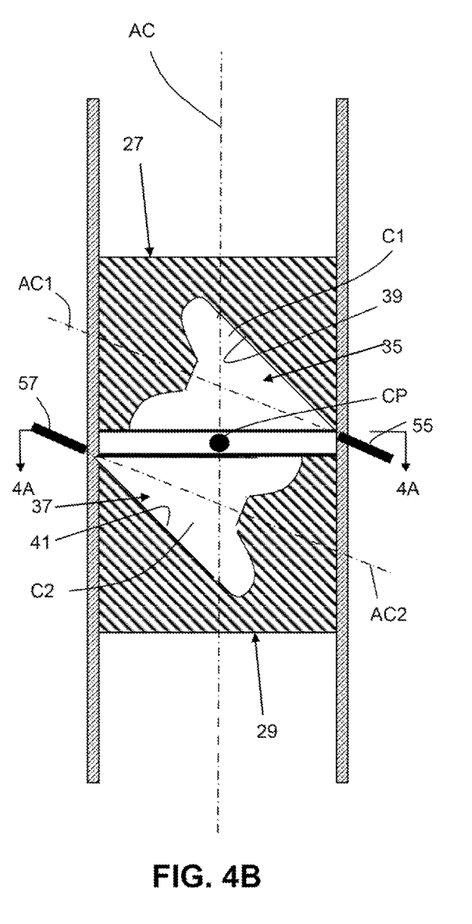

As seen in FIG. 3A, the longitudinal axis AC1 of the cone C1 of the first surface 39 of the recess 35 of a first piston 27 of the pair of opposed pistons can define a non-zero angle α with the longitudinal axis AC2 of the cone C2 of the first surface 41 of the recess 37 of a second piston 29 of the pair of opposed pistons when viewed along an axis AC of the cylinder 25 (seen from the side in FIG. 3B). However, as seen in FIGS. 1A-2D and 4A-4B, in other embodiments, the longitudinal axis AC1 of the cone C1 of the first surface 39 of the recess 35 of a first piston 27 of the pair of opposed pistons can, instead, be aligned with the longitudinal axis AC2 of the cone C2 of the first surface 39 of the recess 37 of a second piston 29 of the pair of opposed pistons when viewed along an axis AC of the cylinder 25. The cone C1 of the first surface 39 of the recess 35 of the first piston 27 can widen in an opposite direction from the cone C2 of the first surface 41 of the recess 37 of the second piston 29 as seen in FIGS. 4A-4B, or can widen in a same direction as the cone of the first surface of the recess of the second piston as seen in FIGS. 1A-2D.

The first surface 39 and 41 of the recess 35 and 37 can define half of the cone C1 and C2, or some lesser portion of the cone as may be desired. For example, if the first surface 39 and 41 of the recess 35 and 37 defines half of the cone C1 and C2, wall portions above the first surface and extending to the face 31 and 33 of the piston 27 and 29 can be parallel to each other and merge smoothly into the first surface as seen in FIG. 1C. As seen in phantom in FIG. 1C, the recesses 35 and 37 may substantially entirely define cone shapes with a minimal opening O toward the faces 31 and 35 of the pistons 27 and 29, however, for ease of manufacturing, the wall portions above the bottom half of the cones will ordinarily extend straight up to the faces and of the piston, particularly when the recesses are formed when casting the pistons. If the first surface 39 and 41 of the recess 35 and 37 defines less than half of the cone C1 and C2, for the wall portions above the first surface and extending to the face 31 and 33 of the piston 27 and 29 to be both flat and merge smoothly into the first surface, the wall portions will be non-parallel to each other.

As seen in FIGS. 2A-2B and 2D, in an opposed piston engine, one (FIGS. 2A and 2D) or both (FIG. 2B) of the cones C1' defined by the first surface of the recess 35 in the piston 27' can have a longitudinal axis AC1' that defines an angle equal to less than one half of the cone angle of the cone with the top plane. In FIG. 2A, part of the cone C1' is disposed above the top plane 31P of the face 31 of the piston 27. For the piston 29 of the pair of opposed pistons, the cone C2 defined by the first surface 41 of the recess 37 is disposed tangent to and otherwise below the top plane 33P of the face 33 of the piston. Alternatively, both (FIG. 2C) or one (FIG. 2D) of the cones C1" and C2" defined by the first surfaces 39 and 41 of the recesses 35 and 37 can be disposed entirely below the top planes 31P and 33P of the faces 31 and 33 of the pistons 27 and 29. Alternatively, as seen in FIG. 2B both of the cones C1' and C2' defined by the first surfaces 39 and 41 of the recesses 35 and 37 can be disposed partially above the top planes 31P and 33P of the faces 31 and 33 of the pistons 27 and 29. While the cones in FIGS. 2A-2D are shown in a manner such that their longitudinal axes are aligned when viewed along the longitudinal axes of the cylinders AC, the cones, particularly in any embodiments in which portions of the cones are disposed above the top planes of the faces of the pistons, will ordinarily be oriented so that longitudinal axes of the cones are at non-zero angles to each so that plumes of fuel injected in the shape of cones do not intersect.

Figure 5A:
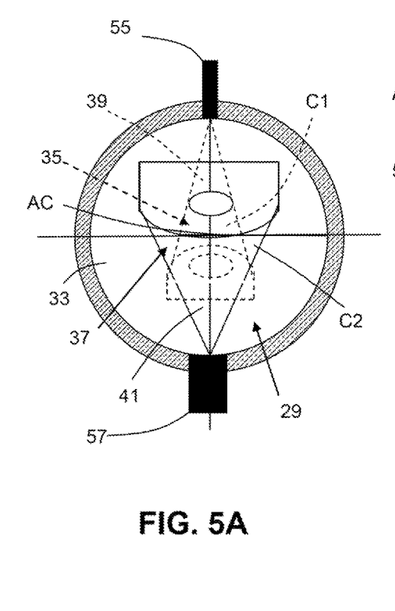
FIGS. 5A-5B are top and side cross-sectional, schematic views of the opposed piston engine of an additional aspect of the present invention with pistons in the cylinder at a second, closest position relative to each other.
Figure 5B:
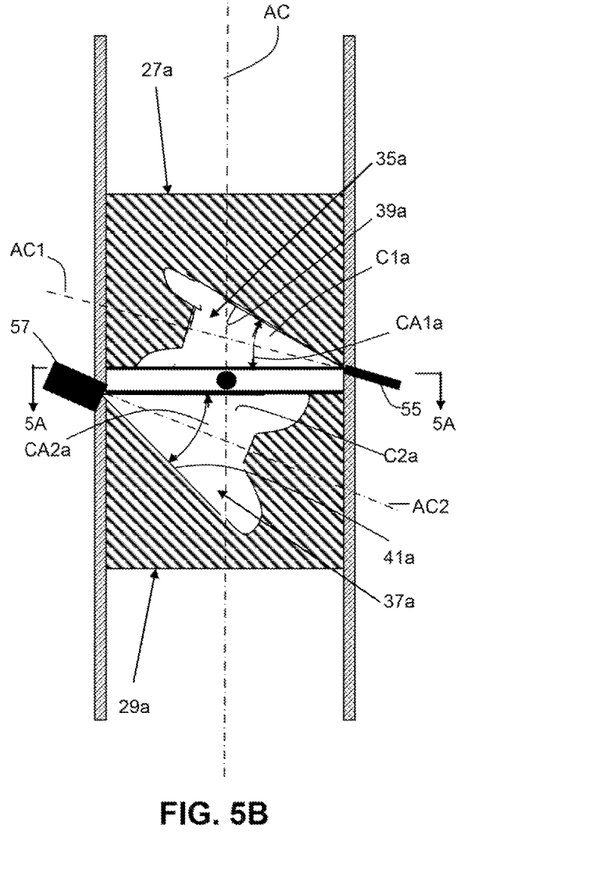
Figure 6A:
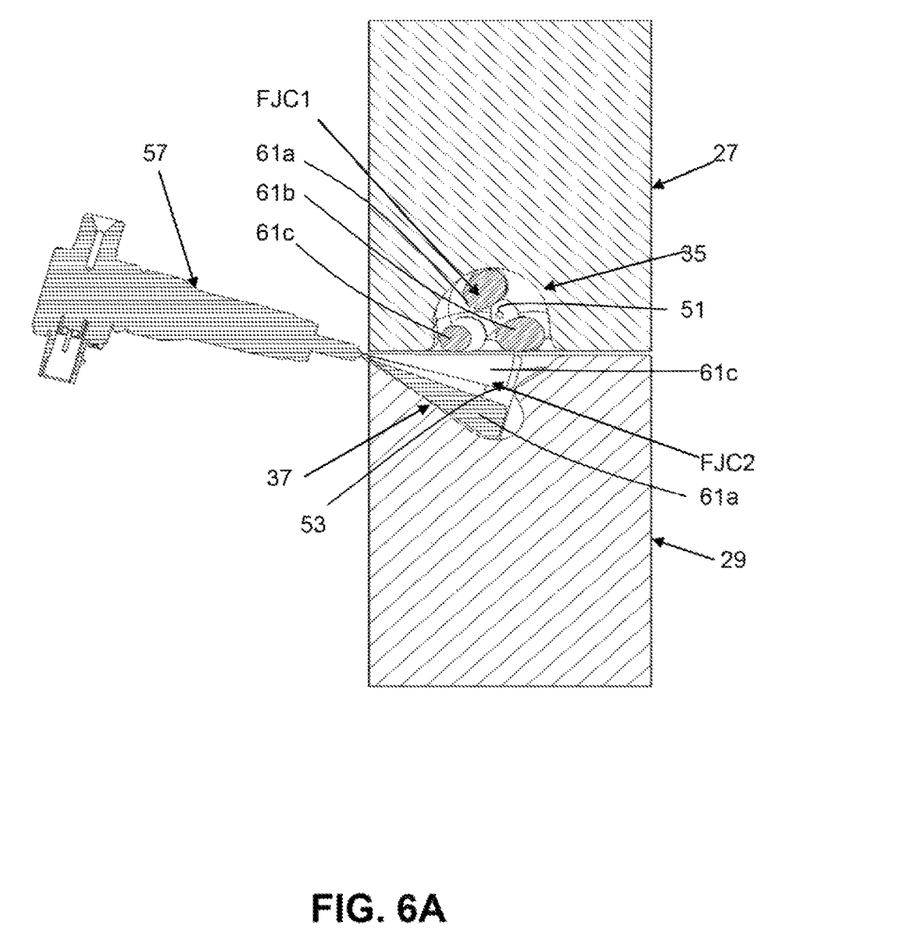
FIG. 6A is a side cross-sectional, schematic view of a portion of the opposed piston engine of an additional aspect of the present invention with pistons in the cylinder at a second, closest position relative to each other and showing plumes of conical fuel jets in recesses of the piston.
Figure 6B:
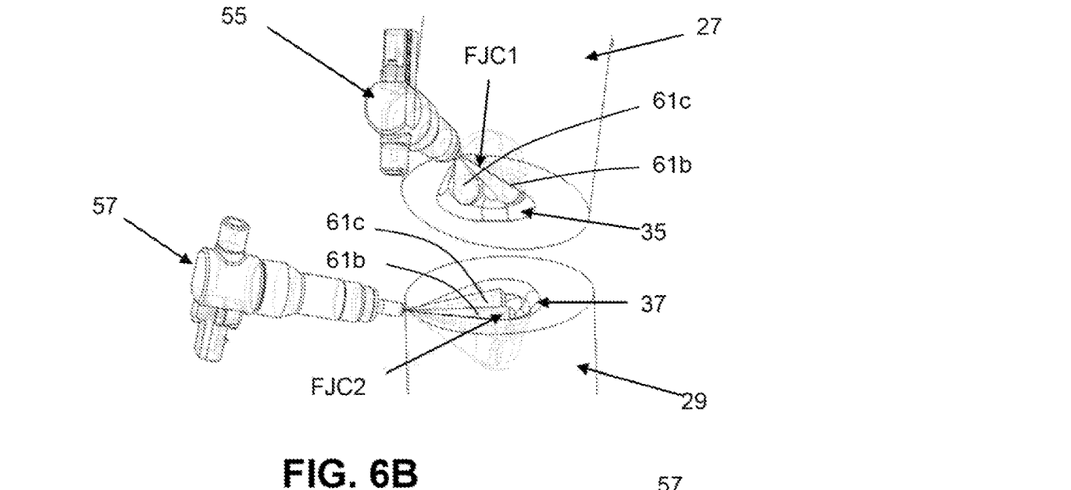
FIG. 6B is a side, partially exploded schematic view of a portion the opposed piston engine of an additional aspect of the present invention with pistons in the cylinder tilted relative to each other to show plumes of conical fuel jets in recesses of the piston.
Figure 6C:
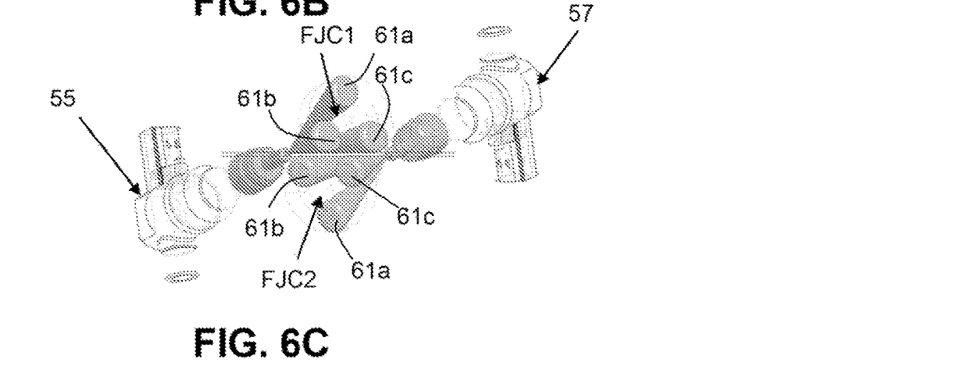
FIG. 6C is a side view of fuel injectors of the opposed piston engine of an additional aspect of the present invention showing plumes of conical fuel jets.
Figure 6D:
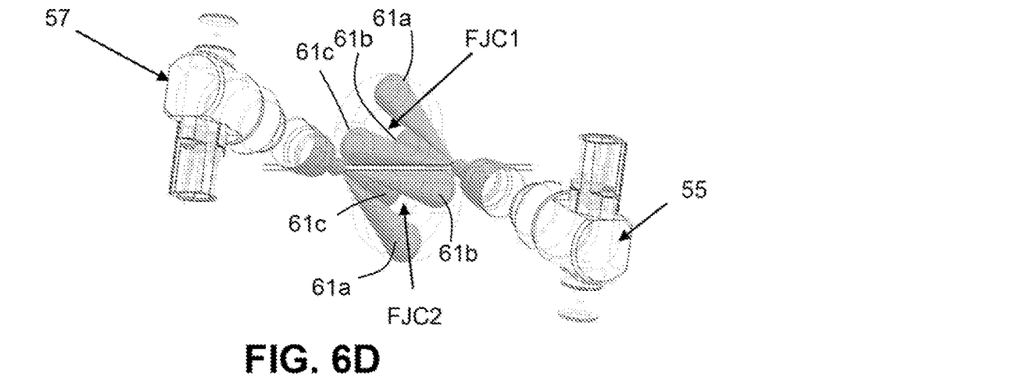
FIG. 6D is a side view of fuel injectors of the opposed piston engine of an additional aspect of the present invention showing plumes of conical fuel jets at a different angle from FIG. 6D.

As seen in FIGS. 5A-5B, a cone C1a defined by the first surface 39a of the recess 35a in a first piston 27a of the pair of opposed pistons can have a different shape than the cone C2a defined by the first surface 41a of the recess 37a in a second piston 29a of the pair of opposed pistons. For example, the cone C1a defined by the first surface 39a of the recess 35a in the first piston 27a of the pair of opposed pistons can have a different cone angle CA1a than the cone angle CA2a of the cone C2a defined by the first surface 41a of the recess 37a in the second piston 29a of the pair of opposed pistons, and/or the cone C1a may be longer or shorter than the cone C2a.

As seen in FIGS. 1A-1B and 2A-6D, the engine 21 can comprise a pair of fuel injectors 55 and 57 in the cylinder wall 25. Each fuel injector 55 and 57 can be configured to inject fuel into the cylinder 23 in a shape of fuel jet cones having fuel jet cone angles substantially equal to the cone angles CA1 and CA2. Ordinarily, the fuel injectors 55 and 57 will be arranged to inject fuel into the cylinder 23 when the pistons 27 and 29 are in a position such that the fuel jet cones coincide with the cones C1 and C2, however, each piston may reach its point closest to the center CP of the cylinder at different times. Each fuel injector 55 and 57 of the pair of fuel injectors can be arranged to inject fuel in the shape of the fuel jet cones along the longitudinal axes AC1 and AC2 of the cones C1 and C2 of the first surfaces 39 and 41 of the recesses 35 and 37 of respective pistons 27 and 29 of the pair of opposed pistons.

As seen in FIG. 6A-6D, each fuel injector 55 and 57 can comprise a plurality of spray orifices adapted to produce multiple spray plumes 61a, 61b, 61c to form fuel jet envelope cones FJC1 and FJC2. Alternatively, as seen in phantom in FIG. 2A-2D, each fuel injector 55 and 57 can comprise a single spray orifice adapted to form the fuel jet cone as a hollow or solid cone.

The fuel injectors 57 and 59 can be designed and controlled to achieve different combustion objectives. For example, as seen in FIGS. 5A-5B, the pair of fuel injectors 55 and 57 can be of different size. They can, in addition, be arranged to supply different amounts of fuel. The pair of fuel injectors 55 and 57 may also be arranged to supply fuel at different times, such as where the injector 55 injects first when the piston 27 reaches the point where it is closest to the center CP of the cylinder, then the injector 57 injects afterward when the piston 29 reaches the point where it is closest to the center of the cylinder.

Regardless of whether the injectors 55 and 57 are multi-hole type or a hollow or solid cone type, it is generally desirable to prevent the different spray elements from colliding, as this causes the fuel droplets to agglomerate, and leads to increased soot formation. The goal with any spray pattern is to allow any droplet path to continually expand in space until it either completely vaporizes or is consumed in the flame. When looked at in aggregate, a multi-hole spray pattern also forms a hollow envelope cone as seen in FIGS. 6A-6D, where the multiple spray plumes form segments of the cone. Naturally, the individual spray plumes expand into smaller cones as well, so the number of spray holes, the envelope cone angle and the distance from the injector to the piston bowl cavity are ordinarily chosen to minimize droplet interactions. Note the base of the cone shape in the recess 35 and 37 ordinarily contains the center "pip" or center protrusion 51 and 53 that helps separate the spray/flame elements radially.

Advantages of aspects of invention include that both injectors 55 and 57 can be placed on the same side of the engine 21, which can make servicing easier, and can facilitate isolating delicate components like fuel passages and electrical features from close proximity to exhaust manifolds, such as by placing the exhaust manifold on only one side of the engine, opposite the fuel system. In addition, by directing each injector spray toward a different piston 27 and 29, this invention can be used with injectors in any location, even on opposite sides of the engine if desired, without their spray plumes colliding. However, a presently preferred embodiment is to place both injectors on the same side of the engine. It is presently contemplated that, in practice, the spacing between the injectors will ordinarily be limited to something less than 90 degrees apart around the circumference of the cylinders to avoid interference with the injectors of adjoining cylinders.

Each injector 55 and 57 is ordinarily angled so that the entire spray pattern is substantially contained within the recess 35 or 37 of one of the pistons 27 or 29. Typically, as in the embodiment of FIGS. 1A-1B, this angle would be about one half of the injector spray envelope cone angle CA1 and CA2, although the angle may be varied. In general, the spray envelope cones of injectors for opposed pistons will be much narrower than used in conventional engines, typically on the order of 30°-90° (versus the 120° that is typical for a conventional engine). The base target angle of the injectors 55 and 57 will thus typically be approximately 15°-45° from a plane perpendicular to the cylinder axis. However, because the pistons 27 and 29 are moving during fuel injection relative to the injector 55 and 57 locations, this angle may be modified to achieve more favorable targeting over a range of piston positions. The angled spray pattern can be achieved by appropriate design of the injector nozzle while still maintaining the axes of the injector bodies normal to the cylinder wall.

To achieve optimal combustion in a particular engine, the recesses 35 and 37 in each piston may be different sizes and have different shape details. The injectors 55 and 57 targeted toward each piston 27 and 29 may have different flow rates, spray patterns and different target envelope angles, and may inject fuel at different times. Providing injectors of different sizes can, for example, allow one small injector that can accurately meter very small amounts of fuel for multi-shot injection, particularly pilot or post injections, while a larger injector can be able to supply the main injection quantity required for desired power in a short time period. In a 2-stroke engine, the time period available for main injection is smaller than with a 4-stroke, so the main injector must be relatively large.

It can be useful to provide different amounts of fuel through the different injectors 55 and 57. For example, in some opposed piston engines, the intake crank is almost always phased to lag behind the exhaust crank. This causes the minimum volume point in the cycle (analogous to top center in a conventional engine) to occur after the exhaust piston is moving outward, but the intake piston is still moving inward. In modern emission controlled diesel combustion, start of injection is normally timed to start shortly before minimum volume, and the main injection extends well after minimum volume. So in an opposed piston engine, the exhaust piston very quickly moves out of position relative to the injectors, while the intake piston dwells with very little movement for some time after minimum volume. In order to keep the injection sprays captured in their respective chambers, the spray directed at the exhaust piston must be cut off before minimum volume, so it can only inject a small amount of fuel before the piston moves out of position. On the other hand, the intake piston is moving into position during the early phase of injection, but will essentially motionless during the time when the main injection takes place. Therefore, in general, it can be useful for the exhaust-directed spray to be smaller than the intake-directed spray.

Different spray patterns from the injectors 55 and 57 can be useful because the exhaust piston will be primarily used for pre- and early injection, while the intake piston will be primarily used for main and post-injection, the two recesses 35 and 37 and associated injectors may be different sizes, and therefore also somewhat different in detail. A larger recess on the intake piston may be flattened, for instance, to limit the depth of the recess into the piston body, or the exhaust piston cavity may be flattened or flared so that the openings in the piston surfaces match better. The details can be altered slightly to address specific design issues without fundamentally changing the concept.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An opposed piston engine, comprising:
    a cylinder having a cylinder wall; and
    a pair of opposed pistons, each piston of the pair of opposed pistons having a face, the pair of pistons being disposed in the cylinder and movable between first positions in the cylinder in which faces of the opposed pistons and the cylinder wall define a maximum volume and second positions in the cylinder in which the faces of the opposed pistons and the cylinder wall define a minimum volume,
    wherein each face of each piston of the pair of opposed pistons has a top plane and a recess formed therein, each recess comprising a first surface defining part of a cone, the cone defined by the first surface of at least one of the recesses having a longitudinal axis that defines an angle equal to at least one half of a cone angle of the cone with the top plane, wherein each recess comprises a U-shaped base surface at a widest end of the cone, and wherein the base surface has a concave, partially toroidal portion and includes a center protrusion at a center of a toroid defined by the toroidal portion.

2. The opposed piston engine as set forth in claim 1, wherein the longitudinal axis of the cone of the first surface of the recess of a first piston of the pair of opposed pistons defines a non-zero angle with the longitudinal axis of the cone of the first surface of the recess of a second piston of the pair of opposed pistons when viewed along an axis of the cylinder.

3. The opposed piston engine as set forth in claim 1, wherein the longitudinal axis of the cone of the first surface of the recess of a first piston of the pair of opposed pistons aligned with the longitudinal axis of the cone of the first surface of the recess of a second piston of the pair of opposed pistons when viewed along an axis of the cylinder.

4. The opposed piston engine as set forth in claim 3, wherein the cone of the first surface of the recess of the first piston widens in an opposite direction from the cone of the first surface of the recess of the second piston.

5. The opposed piston engine as set forth in claim 3, wherein the cone of the first surface of the recess of the first piston widens in a same direction as the cone of the first surface of the recess of the second piston.

6. The opposed piston engine as set forth in claim 1, wherein the first surface defines half of the cone.

7. The opposed piston engine as set forth in claim 1, wherein, for at least one piston of the pair of opposed pistons, the cone defined by the first surface is disposed below the top plane.

8. The opposed piston engine as set forth in claim 1, wherein the cone defined by the first surface of the recess in a first piston of the pair of opposed pistons has a different shape than the cone defined by the first surface of the recess in a second piston of the pair of opposed pistons.

9. The opposed piston engine as set forth in claim 1, wherein the cone defined by the first surface of the recess in a first piston of the pair of opposed pistons has a different cone angle than the cone angle of the cone defined by the first surface of the recess in a second piston of the pair of opposed pistons.

10. The opposed piston engine as set forth in claim 1, wherein, for each piston of the pair of opposed pistons, the angle defined by the longitudinal axis of the cone defined by the first surface with the top plane is equal to at least one half of the cone angle of the cone.

11. The opposed piston engine as set forth in claim 1, comprising a pair of fuel injectors in the cylinder wall, each fuel injector being configured to inject fuel into the cylinder in a shape of a fuel jet cone having a fuel jet cone angle substantially equal to the cone angle.

12. The opposed piston engine as set forth in claim 11, wherein each fuel injector of the pair of fuel injectors is arranged to inject fuel in the shape of the fuel jet cone along the longitudinal axis of the cone of the first surface of the recess of a respective one of the pair of opposed pistons.

13. The opposed piston engine as set forth in claim 11, wherein each fuel injector comprises a plurality of spray orifices adapted to produce multiple spray plumes to form the fuel jet cone as an envelope cone.

14. The opposed piston engine as set forth in claim 11, wherein each fuel injector comprises a single spray orifice with a central pintle adapted to form the fuel jet cone as a hollow or solid cone.

15. The opposed piston engine as set forth in claim 11, wherein the pair of fuel injectors are of different size.

16. The opposed piston engine as set forth in claim 11, wherein the pair of fuel injectors are arranged to supply different amounts of fuel.

17. The opposed piston engine as set forth in claim 11, wherein the pair of fuel injectors are arranged to supply fuel at different times.

18. An opposed piston engine, comprising:
    a cylinder having a cylinder wall; and
    a pair of opposed pistons, each piston of the pair of opposed pistons having a face, the pair of pistons being disposed in the cylinder and movable between first positions in the cylinder in which faces of the opposed pistons and the cylinder wall define a maximum volume and second positions in the cylinder in which the faces of the opposed pistons and the cylinder wall define a minimum volume, wherein each face of each piston of the pair of opposed pistons has a lop plane and a recess formed therein, each recess comprising a first surface defining part of a cone, the cone defined by the first surface of at least one of the recesses having a longitudinal axis that defines an angle equal to at least one half of a cone angle of the cone with the top plane, wherein each recess comprises a U-Shaped base surface at a widest end of the cone, and wherein the longitudinal axis of the cone of the first surface of the recess of a first piston of the pair of opposed pistons defines a non-zero angle with the longitudinal axis of the cone of the first surface of the recess of a second piston of the pair of opposed pistons when viewed along an axis of the cylinder.

\* \* \* \* \*